United States Patent [19]

Homan et al.

[11] Patent Number: 4,585,836

[45] Date of Patent: Apr. 29, 1986

[54] SILICONE PRESSURE-SENSITIVE ADHESIVE PROCESS AND PRODUCT WITH IMPROVED LAP-SHEAR STABILITY-II

[75] Inventors: Gary R. Homan; Harold L. Vincent, both of Midland, Mich.

[73] Assignee: Dow Corning Corporation, Midland, Mich.

[21] Appl. No.: 665,796

[22] Filed: Oct. 29, 1984

[51] Int. Cl.$^4$ ............................................. C08L 83/06
[52] U.S. Cl. ................................... 525/477; 524/500; 524/588; 525/478; 528/34
[58] Field of Search .................. 525/477, 478; 528/34; 524/500, 588

[56] References Cited

U.S. PATENT DOCUMENTS

| | | | |
|---|---|---|---|
| 2,736,721 | 2/1956 | Dexter | 260/42 |
| 2,814,601 | 11/1957 | Currie et al. | 260/29.1 |
| 2,857,356 | 10/1958 | Goodwin | 260/42 |
| 3,528,940 | 9/1970 | Modic | 260/37 |
| 3,929,704 | 12/1975 | Horning | 260/29.1 SB |
| 3,983,298 | 9/1976 | Hahn et al. | 428/355 |
| 4,255,316 | 3/1981 | Blizzard | 260/37 SB |
| 4,309,520 | 1/1982 | Blizzard | 525/477 |
| 4,374,950 | 2/1983 | Shimizu | 528/33 |
| 4,417,042 | 11/1983 | Dziark | 528/34 |

FOREIGN PATENT DOCUMENTS

| | | |
|---|---|---|
| 575664 | 5/1959 | Canada . |
| 711756 | 6/1965 | Canada . |

Primary Examiner—Wilbert J. Briggs, Sr.
Attorney, Agent, or Firm—Richard E. Rakoczy

[57] ABSTRACT

This invention relates to silicone pressure-sensitive adhesives having improved viscosity stability, film physical property stability upon aging and lap shear stability made by a method comprising the condensation of a benzene-soluble resin copolymer of 0.6 to 0.9 triorganosiloxy units per $SiO_{4/2}$ unit which contains silicon-bonded hydroxyl radicals and a polydiorganosiloxane preferably containing silicon-bonded hydroxyl or other hydrolyzable endblocking radicals with a sufficient amount of an ammonia releasing endblocking agent containing endblocking triorganosilyl units such as hexamethyldisilazane to result in a 1:0.8 to 1:3 mole ratio of silicon-bonded hydroxyl radicals and hydrolyzable endblocking radicals to total moles of triorganosilyl units provided by the endblocking agent. The condensation is conducted with heating at 80° C.–160° C. in the presence of 0.1 to 10 moles of water per mole of $=NH$ present in the endblocking agent, 0.001 to 10 parts by weight per 100 parts by weight of total resin copolymer and polydiorganosiloxane and when necessary, in the presence of an effective amount of an organic solvent such as xylene. Condensation is preferably conducted under solvent reflux conditions. When the condensation reaction is substantially complete, the remaining endblocking agent, water, ammonia scavenger compound and ammonia released by the endblocking agent is stripped from the composition.

32 Claims, No Drawings

SILICONE PRESSURE-SENSITIVE ADHESIVE PROCESS AND PRODUCT WITH IMPROVED LAP-SHEAR STABILITY-II

BACKGROUND OF THE INVENTION

This invention relates to a method of improving the lap shear stability of a silicone pressure-sensitive adhesive composition produced by a method involving endblocking the residual silanol groups present in the composition with triorganosilyl units derived from triorganosilazanes and/or triorganosilylamines by including an amount of water and an organic compound having both a polar radical and a non-polar portion such as an alcohol in the reaction mixture during the endblocking reaction. This invention also relates to the silicone pressure-sensitive adhesives obtained through the use of that method.

In a U.S. patent application Ser. No. 665,797 entitled "Silicone Pressure-Sensitive Adhesive Process and Product Thereof" which is being filed concurrently herewith and assigned to the same assignee as the present invention (hereby incorporated by reference), John J. Blizzard and Terence J. Swihart teach an improved method of making a silicone pressure-sensitive adhesive by (I) mixing (A) a silanol-containing copolymer resin of 0.6 to 0.9 triorganosiloxy units per $SiO_{4/2}$ unit, (B) a polydiorganosiloxane, preferably one containing endblocking X radicals such as silanol or other hydrolyzable radicals, (C) a sufficient amount of an endblocking agent capable of providing endblocking triorganosilyl units such as hexamethyldisilazane or trimethylmethoxysilane to result in a 1:0.8 to 1:3 mole ratio of total moles of silicon-bonded hydroxyl radicals and hydrolyzable endblocking radicals to total moles of triorganosilyl units provided by the endblocking agent, (D) when desirable, a catalytic amount of a mild silanol condensation catalyst if one is not otherwise generated by (C), and (E), when necessary, an effective amount of an organic solvent to reduce the viscosity of the mixture of (A), (B), (C) and (D), and (II) condensing the mixture of (A), (B), (C) and (D) at least until a substantial amount of the endblocking triorganosilyl units have reacted with the silicon-bonded hydroxyl and hydrolyzable X radicals of said (A) and (B), and more preferably, at least until the rate of evolution of condensation by-products is substantially constant and the desired adhesive physical property profile is obtained. Condensation is preferably conducted with heating under solvent reflux conditions. After the condensation is complete, a solvent and/or other ingredients can be added to complete the production of the silicone pressure-sensitive adhesive.

As a result of the simultaneous condensation and endblocking of the resin copolymer and polydiorganosiloxane, the silanol content of the silicone pressure-sensitive adhesive product is reduced to a minimum thereby improving the viscosity stability and physical property stability upon aging of the resulting silicone pressure-sensitive adhesive. A further advantage of the Blizzard and Swihart invention is that the physical properties of the resulting silicone pressure-sensitive adhesive such as tack or adhesion can be modified by changing the level of endblocking agent and/or the type of endblocking agent employed.

As noted in Example 11 of the Blizzard and Swihart Application, the hold time (an accelerated test to measure of lap shear stability which is more fully described, infra) of silicone pressure-sensitive adhesives made using endblocking agents which release ammonia (i.e., organosilazanes) were low relative to other silicone pressure-sensitive adhesive compositions tested. This reduced hold time was thought to be due to the presence of ammonia in the composition and Example 12 showed that it was possible to increase the hold time by adding an amount of water either before or during processing of the pressure-sensitive adhesive composition. The use of water in combination with triorganosilazanes and/or triorganosilylamines to make pressure-sensitive adhesives is claimed in a U.S. patent application Ser. No. 665,805 to John D. Blizzard and Dipak Narula entitled "Silicone Pressure-Sensitive Adhesive Process an Product With Improved Lap Shear Stability-I" which is filed concurrently herewith and assigned to the same assignee as the present invention (hereby incorporated by reference). Compositions produced according to the Blizzard process gave improved hold times over those produced without addition of water, particularly when the compositions contained larger amounts of resin copolymer and thereby contained a higher silicon-bonded hydroxyl content in the composition with which the polar ammonia could associate. Compositions made using alkoxysilanes which are free of ammonia exhibited excellent resistance to creep (high temperature lap shear stability) and would therefore be expected to exhibit improved hold times. Long hold times and resistance to creep are desirable properties where the pressure-sensitive adhesive composition is to be used to adhere an object to a vertical surface or where the composition is used on a pressure-sensitive adhesive tape which will be exposed to stress or heat during use.

SUMMARY OF THE INVENTION

It is the primary object of the present invention to improve the lap shear stability (i.e., the hold time and the resistance to creep—high temperature lap shear stability) of silicone pressure-sensitive adhesives made by the aforementioned Swihart and Blizzard process when endblocking agents releasing ammonia are employed in that process.

It is another object of the present invention to provide a method of making a silicone pressure-sensitive adhesive composition which has improved viscosity stability and film physical property stability upon aging as compared with cold blends of silicon-bonded hydroxyl radical containing ("silanol-containing") silicone copolymer resins of triorganosiloxy units and $SiO_{4/2}$ units with polydiorganosiloxanes having silanol or hydrolyzable endblocking radicals.

These and other objects of the present invention are provided by a method of making a silicone pressure-sensitive adhesive by (I) mixing (A) a silanol-containing copolymer resin of 0.6 to 0.9 triorganosiloxy units per $SiO_{4/2}$ unit, (B) a polydiorganosiloxane, preferably one containing endblocking X radicals such as silanol or other hydrolyzable radicals, (C) a sufficient amount of an endblocking agent capable of providing endblocking triorganosilyl units and releasing ammonia upon reaction of said endblocking triorganosilyl units such as hexamethyldisilazane to result in a 1:0.8 to 1:3 mole ratio of total moles of silicon-bonded hydroxyl radicals and hydrolyzable endblocking radicals to total moles of triorganosilyl units provided by the endblocking agent, (D) from 0.1 to 10 moles of water per mole of =NH provided by said (C), (E) from 0.001 to 10 parts by weight of an ammonia scavenger compound which is preferably isopropanol, and (F), when necessary, an effective amount of an organic solvent such as xylene to reduce the viscosity of the mixture of (A), (B) and (C), (II) condensing (A), (B) and (C) at a temperature of from 80° C. to 160° C. and at the same time at least periodically removing any condensation by-products from the mixture at least until a substantial amount of the triorganosilyl units have reacted with the silicon-bonded hydroxyl radicals and X radicals of said (A) and (B), and (III) stripping substantially any remaining condensation by-products, (D) and (E) from the mixture after the condensation reaction of step (II) is substantially complete. Step (II) is more preferably conducted until the rate of evolution of condensation by-products is substantially constant and the desired physical property profile is obtained. Stripping of the (D) and (E) results in better removal of residual ammonia from the product and thereby improves the lap shear stability of the resulting product. After the condensation and stripping are complete, a solvent and/or other ingredients can be added to complete the production of the silicone pressure-sensitive adhesive composition.

As a result of the simultaneous condensation and endblocking of the resin copolymer and polydiorganosiloxane, the silanol content of the silicone pressure-sensitive adhesive product is reduced to a minumum thereby improving the viscosity stability and physical property stability upon aging of the resulting silicone pressure-sensitive adhesive. A further advantage of the present invention is that the physical properties of the resulting silicone pressure sensitive adhesive such as tack or adhesion can be modified by changing the level of endblocking agent and/or the type of endblocking agent employed. The use of an ammonia scavenger compound in combination with water is novel and appears to improve the efficiency of the removal of ammonia from the composition.

DETAILED DESCRIPTION OF THE INVENTION

This invention relates to a method of making a silicone pressure-sensitive adhesive composition having improved lap shear stability which consists essentially of the steps of:

(I) mixing (A) from 40 to 70 inclusive parts by weight of at least one benzene-soluble resin copolymer containing silicon-bonded hydroxyl radicals and consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present, (B) from 30 to 60 parts by weight of at least one polydiorganosiloxane consisting essentially of $ARSiO$ units terminated with endblocking $TRASiO_{\frac{1}{2}}$ units, each said polydiorganosiloxane having a viscosity of from 100 centipoise to 30,000,000 centipoise at 25° C., and each T is R— or X—, (C) a sufficient amount of at least one organosilicon endblocking agent capable of generating an endblocking triorganosilyl unit of the formula $ZR_2Si$— to provide a 1:0.8 to 1:3 mole ratio of total silicon-bonded hydroxyl and X radicals present in said (A) and (B) to total endblocking triorganosilyl units provided by all endblocking agent present, said agent being selected from the group consisting of $ZR_2SiNH_2$ and $(ZR_2Si)_2NH$, (D) from 0.1 to 10 moles of water per mole of =NH provided by said (C), (E) from 0.001 to 10 parts by weight per 100 parts by weight of (A) and (B) of at least one ammonia scavenger compound selected from the group consisting of $HOC_mH_{2m+1}$, $HOC_xH_{2x}(OC_xH_{2x})_y(O)_vH$, $C_wH_{2w+1}(OC_xH_{2x})_yOC_wH_{2w+1}$, $C_wH_{2w+1}C(O)OC_nH_{2n+1}$, and $HC(O)OC_nH_{2n+1}$, and (F) when necessary, an effective amount of an organic solvent which is inert with respect to (A) through (E), inclusive, to reduce the viscosity of a mixture of (A), (B), and (C), (II) condensing (A), (B) and (C) at a temperature of from 80° C. to 160° C. and at the same time at least periodically removing any condensation by-products from the mixture at least until a substantial amount of the endblocking triorganosilyl units have reacted with the silicon-bonded hydroxyl radicals and X radicals of said (A) and (B), and (III) stripping substantially any remaining condensation by-products, (D) and (E) from the mixture after the condensation reaction of step II is substantially complete, wherein each R is a monovalent organic radical selected from the group consisting of hydrocarbon radicals of from 1 to 6 inclusive carbon atoms, each X radical is selected from the group consisting of HO—, H— and R'O— radicals, each R' is an alkyl radical of from 1 to 4 inclusive carbon atoms, m has a value of from 2 to 4, n has a value of from 1 to 6, v is 0 or 1, w has a value of from 1 to 3, x has a value of from 2 to 6, y has a value of from 0 to 3, each A radical is selected from the group consisting of R— and halohydrocarbon radicals of from 1 to 6 inclusive carbon atoms, each Z radical is A— or QR"—, each R" is a divalent alkylene radical of from 1 to 6 inclusive carbon atoms, each Q is an organofunctional monovalent radical selected from the group consisting of RCOE'—, RE'OC—, NC—, R'E'—, HO—, $G_2N$—, $HO(R"O)_n$— and $G_2NCH_2CH_2NG$— where E' is —O—, —NH— or —S—, and each G is R'— or H—.

This invention also relates to the pressure-sensitive adhesive compositions obtained in accordance with that method.

The pressure-sensitive adhesive compositions are made in accordance with the present invention using from 40 to 70 inclusive parts by weight of silicone copolymer resins (A) and from 30 to 60 parts by weight of polydiorganosiloxanes (B) of the type which have been used in the past to make such compositions. More preferred are compositions employing from 45 to 60 parts by weight of resin copolymer (A) and from 40 to 55 parts by weight of polydiorganosiloxane (B).

The benzene-soluble silicone resin copolymers (A) are well-known materials. They contain silicon-bonded hydroxyl radicals in amounts which typically range from about 1 to 4 weight percent of silicon-bonded hydroxyl radicals and consist essentially of $R_3SiO_{\frac{1}{2}}$ units and $SiO_{4/2}$ units in a mole ratio of from 0.6 to 0.9 $R_3Si_{\frac{1}{2}}$ units for each $SiO_{4/2}$ unit present. Blends of two or more such copolymers may also be used. To be useful in the method of this invention, there should be at least some, and preferably at least 0.5%, silicon-bonded hydroxyl content to enable the polydiorganosiloxane component to copolymerize with the copolymer resin and/or to react with the endblocking agent being added. These resin copolymers are benzene-soluble resinous materials which are typically solids at room temperature and are prepared as, and usually, but not necessarily used as, a solution in an organic solvent. Typical organic solvents used to dissolve resin copolymer (A) include benzene, toluene, xylene, methylene chloride, perchloroethylene, naphtha mineral spirits and mixtures of these.

Resin copolymer (A) consists essentially of from 0.6 to 0.9 $R_3SiO_{\frac{1}{2}}$ units for every $SiO_{4/2}$ unit in the copolymer. There may also be a few mole percent of $R_2SiO$ units present in the copolymer provided that the presence of such units does not cause the ultimate product of the process of this invention to lose its ability to function as a pressure-sensitive adhesive. Each R denotes, independently, a monovalent hydrocarbon radical having from 1 to 6 inclusive carbon atoms such as methyl, ethyl, propyl, isopropyl, hexyl, cyclohexyl, vinyl, allyl, propenyl and phenyl. Preferably, the $R_3SiO_{\frac{1}{2}}$ units are $Me_2R'''SiO_{\frac{1}{2}}$ units wherein is $R'''$ is a methyl ("Me"), vinyl ("Vi") or phenyl ("Ph") radical. More preferably, no more than 10 mole percent of the $R_3SiO_{\frac{1}{2}}$ units present in resin copolymer (A) are $Me_2R''''SiO_{\frac{1}{2}}$ units and the remaining units are $Me_3SiO_{\frac{1}{2}}$ units where each $R''''$ is a methyl or a vinyl radical.

The mole ratio of $R_3SiO_{\frac{1}{2}}$ and $SiO_{4/2}$ units can be determined simply from a knowledge of the identity of the R radicals in the $R_3SiO$ units and the percent carbon analysis of the resin copolymer. In the preferred resin copolymer consisting of from 0.6 to 0.9 $Me_3SiO_{\frac{1}{2}}$ units for every $SiO_{4/2}$ unit, the carbon analysis has a value of from 19.8 to 24.4 percent by weight.

Resin copolymer (A) may be prepared according to Daudt et al., U.S. Pat. No. 2,676,182 (issued 4/20/54 and hereby incorporated by reference) whereby a silica hydrosol is treated at a low pH with a source of $R_3SiO_{\frac{1}{2}}$ units such as a hexaorganodisiloxane such as $Me_3Si-OSiMe_3$, $ViMe_2SiOSiMe_2Vi$ or $MeViPhSiOSiPhViMe$ or triorganosilane such as $Me_3SiCl$, $Me_2ViSiCl$ or $MeViPhSiCl$. Such copolymer resins are typically made such that the copolymer resin contains about 1 to 4 weight percent of silicon-bonded hydroxyl radicals. Alternatively, a mixture of suitable hydrolyzable silanes free of R radicals may be cohydrolyzed and condensed. In this alternative procedure, it is a typical practice to further treat the copolymer product with a suitable silylating agent, such as hexamethyldisilazane or divinyltetramethyldisilazane, to reduce the silicon-bonded hydroxyl content of the copolymer product to less that 1 percent by weight. This step would not be necessary, but could be used, in the process of the present invention. Preferably, the resin copolymers employed contain from about 1 to 4 weight percent of silicon-bonded hydroxyl radicals.

Ingredient (B) is also a well-known material and is one or more polydiorganosiloxanes consisting essentially of ARSiO units terminated with endblocking $TRASiO_{\frac{1}{2}}$ units, each of which polydiorganosiloxanes has a viscosity of from 100 centipoise to 30,000,000 centipoise at 25° C. (100 millipascal-seconds to 30,000 pascal seconds (Pa·s) where 1 centipoise equals 1 millipascal second). As is well-known, viscosity is directly related the average number of diorganosiloxane units present for a series of polydiorganosiloxanes of varying molecular weights which have the same endblocking units. Polydiorganosiloxanes having a viscosity of from about 100 to 100,000 centipoise at 25° C. range from fluids to somewhat viscous polymers. These polydiorganosiloxanes are preferably prereacted with resin copolymer (A) prior to condensation in the presence of endblocking agent (C) to improve the tack and adhesion properties of the resulting pressure-sensitive adhesive as will be further described. Polydiorganosiloxanes having viscosities in excess of 100,000 centipoise can typically be subjected to the condensation/endblocking step (II) of the present invention without prereaction. Polydiorganosiloxanes having viscosities in excess of 1,000,000 centipoise are highly viscous products often referred to as gums and the viscosity is often expressed in terms of a Williams Plasticity value (polydimethylsiloxane gums of about 10,000,000 centipoise viscosity typically have a Williams Plasticity Value of about 50 mils (1.27 mm) or more at 25° C.).

The polydiorganosiloxanes of (B) consist essentially of ARSiO units where each R is as defined above. Each A radical is selected from radicals such as R— or halohydrocarbon radicals of from 1 to 6 inclusive carbon atoms such a chloromethyl, chloropropyl, 1-chloro,-2-methylpropyl, 3,3,3,-trifluoropropyl and $F_3C(CH_2)_5$- radicals. Thus the polydiorganosiloxane can contain $Me_2SiO$ units, $PhMeSiO$ units, $MeViSiO$ units, $Ph_2SiO$ units, methylethylsiloxy units 3,3,3-trifluoropropyl units and 1-chloro,-2-methylpropyl units and the like. Preferably, the ARSiO units are selected from the group consisting of $R'''_2SiO$ units, $Ph_2SiO$ units and combinations of both where $R'''$ is as above, at least 50 mole percent of the $R'''$ radicals present in the polydiorganosiloxane (B) are methyl radicals and no more than 50 mole percent of the total moles of ARSiO units present in each polydiorganosiloxane of (B) are $Ph_2SiO$ units. More preferably, no more than 10 mole percent of the ARSiO units present in each polydiorganosiloxane (B) are $MeR''''SiO$ units where $R''''$ is as above defined and the remaining ARSiO units present in each polydiorganosiloxane are $Me_2SiO$ units.

Each polydiorganosiloxane (B) is terminated with endblocking units of the unit formula $TRASiO_{\frac{1}{2}}$ where R and A are as defined above and each T radical is R or X wherein each X radical is selected from the group consisting of HO—, H— and R'O— radicals where each R' is an alkyl radical of from 1 to 4 inclusive carbon atoms such as methyl, ethyl, n-propyl, and isobutyl radicals. The X radicals provide a site for reaction with the endblocking triorganosilyl units of ingredient (C) and also provide a site for condensation with other X radicals on polydiorganosiloxanes (B) or with the silicon-bonded hydroxyl groups present in resin copolymer (A). Use of polydiorganosiloxanes where T is HO— is most preferred because the polydiorganosiloxane (B) can then readily copolymerize with the resin copolymer (A). Since ammonia which is generated when the endblocking agents used in this invention react with silicon-bonded hydroxyl radicals, triorganosiloxy (e.g., $R_3SiO_{\frac{1}{2}}$ such as $(CH_3)_3SiO_{\frac{1}{2}}$ or $CH_2=CH(CH_3)_2SiO_{\frac{1}{2}}$) unit terminated polydiorganosiloxanes can be employed because some of the triorganosiloxy units can be cleaved in the presence of the ammonia catalyst when the condensation reaction is conducted with heating. The cleavage exposes a silicon-bonded hydroxyl radical which can then condense with silicon-bonded hydroxyl radicals in the copolymer resin, with endblocking triorganosilyl units or with other polydiorganosiloxanes containing X radicals or silicon-bonded hydroxyl radicals exposed by cleavage reactions. Mixtures of polydiorganosiloxanes containing different substituent radicals may also be used.

Methods for the manufacture of such polydiorganosiloxanes are well known as exemplified by the following U.S. Pat. Nos.: 2,490,357 (Hyde); 2,542,334 (Hyde); 2,927,907 (Polmanteer); 3,002,951 (Johannson); 3,161,614 (Brown, et al.); 3,186,967 (Nitzche, et al.); 3,509,191 (Atwell) and 3,697,473 (Polmanteer, et al.) which are hereby incorporated by reference.

To obtain pressure-sensitive adhesives which are to be cured by peroxide or through aliphatically unsaturated radicals present in resin copolymer (A) or polydiorganosiloxane (B), if resin copolymer (A) contains aliphatically unsaturated radicals, then polydiorganosiloxane (B) should be free of such radicals and viceversa. If both components contain aliphatically unsaturated radicals, curing through such radicals can result in products which do not act as pressure-sensitive adhesives.

In the process of the present invention, the condensation of resin copolymer (A) and polydiorganosiloxane (B) is conducted in the presence of at least one organosilicon endblocking agent (C) capable of generating an endblocking triorganosilyl unit of the formula $ZR_2Si$—. The endblocking agent capable of providing such a triorganosilyl unit is selected from the group consisting of $ZR_2SiNH$ and $(ZR_2Si)_2NH$ where R is as previously defined and each G is R'— or H—. Preferably, the endblocking agent is of the formula $(AR_2Si)_2NH$ and each R present in the endblocking agent is a methyl or a phenyl radical.

Each Z radical is selected from radicals such as A— and QR"— radicals where A is as previously defined and R" is a divalent alkylene radical of from 1 to 6 inclusive carbon atoms such as ethylene, propylene, 2-methylpropylene, butylene and hexylene.

Each Q is a monovalent organofunctional radical which is useful in altering the physical properties of the pressure-sensitive adhesive film. Preferably, the Q radical does not condense with the silanol radicals present in the resin copolymer (A) and/or with the X radicals present in polydiorganosiloxane (B) during the condensation step (II) of the present invention. Q can be a monovalent radical selected from the group consisting of RCOE'— where E' is —O—, —NH— or —S— such as RCOO— such as $CH_3COO$—, $CH_2$=$CCH_3COO$—, and $CH_3(CH_2)_3COO$—, RCONH— such as $CH_3CONH$—, and RCOS— such as $CH_3CH_2COS$—, RE'OC— such as $C_2H_5OOC$—, $CH_3CH_2CH_2CH_2NHOC$— and $CH_3CH_2CH_2SOC$—, cyano which is NC—, HO—, R'E' such as $CH_3CH_2CH_2O$— and R'S— such as $CH_3CH_2CH_2S$—, and $G_2N$— such as $H_2N$— and $C_2H_5NH$—, and $HO(R-"O)_n$— where n has a value of from 1 to 6 such as $HOCH_2CH_2O$— and $G_2NCH_2CH_2NG$— such as $H_2NCH_2CH_2NH$—.

Preferably, Z is selected from the group consisting of methyl, vinyl and 3,3,3-trifluoropropyl radicals and more preferably is a methyl or vinyl radical.

Endblocking agents capable of providing endblocking triorganosilyl units are commonly employed as sylilating agents and a wide variety of such agents are known. A single endblocking agent such as hexamethyldisilazane can be employed or a mixture of such agents such as hexamethyldisilazane and sym-tetramethyldivinyldisilazane can be employed to vary the physical properties of the pressure-sensitive adhesive film. For example, use of an endblocking agent containing fluorinated triorganosilyl units such as $[(CF_3CH_2CH_2)Me_2Si]_2NH$ in the process of the present invention could result in a silicone pressure-sensitive adhesive having improved resistance to hydrocarbon solvents after the film is deposited and the presence of the fluorinated triorganosilyl units could affect the tack and adhesion properties of the pressure-sensitive adhesive when the R radicals present in the resin copolymer (A) and the polydiorganosiloxane (B) are substantially composed of methyl radicals. By employing endblocking agents containing higher carbon content silicon-bonded organic radicals such as ethyl, propyl or hexyl radicals, the compatibility of the silicone pressure-sensitive adhesive with organic pressure-sensitive adhesives could be improved to allow blending of such adhesives to obtain improved adhesive compositions. Use of endblocking agents having triorganosilyl units having organofunctional radicals such as amides, esters, ethers and cyano radicals could allow one to change the release properties of a pressure-sensitive adhesive made in accordance with the present invention. Such organofunctional radicals, particularly amino-functional radicals, may not be desirable when optimum lap shear stability is desired. Likewise, organofunctional radicals present in the pressure-sensitive adhesive composition can be altered such as by hydrolyzing ROOCR"— radicals to generate HOOCR"— radicals which are converted to MOOCR"— radicals where M is a metal cation such as lithium, potassium or sodium. The resulting composition may then exhibit release or other properties different from a composition containing RCOOR"— radicals.

Use of endblocking agents containing triorganosilyl units with unsaturated organic radicals such as vinyl can produce silicone pressure-sensitive adhesives which can be cross-linked through such groups. For example, an organosilicon cross-linking compound containing silicon-bonded hydrogen radicals can be added along with a noble metal such as a platinum metal or rhodium metal catalyst to a silicone pressure-sensitive adhesive composition made in accordance with the present invention which contains PhMeViSi— and $Me_3Si$— endblocking triorganosilyl units to produce a pressure-sensitive adhesive composition which cures via the platinum catalyzed addition of silicon-bonded hydrogen radicals to silicon-bonded vinyl radicals. Use of endblocking agents containing triorganosilyl units with phenyl radicals could improve the stability of the pressure-sensitive adhesive to heat.

Thus, the endblocking agent serves several purposes in the present invention because it removes silicon-bonded hydroxyl radicals which can affect the viscosity and physical property stability of the resulting pressure sensitive adhesive, it enables one to modify the properties of the adhesive without making substantial changes in the resin copolymer and polydiorganosiloxanes and by selecting an appropriate level of endblocking agent, one can alter the molecular weight of the condensation product of the resin copolymer (A) and polydiorganosiloxane (B) since the triorganosilyl units act as endblocking units.

In order to achieve the primary objective of the present invention, one must add at least a sufficient amount of one or more endblocking agents to provide at least a 0.8:1 mole ratio of total endblocking triorganosilyl units to total silicon-bonded hydroxyl radicals present in resin copolymer (A) and polydiorganosiloxane (B). A 1:1 ratio may not always be necessary since condensation between the resin copolymer (A) and polydiorganosiloxane (B) also effectively removes silicon-bonded hydroxyl radicals. The resin copolymer (A) will typically contain the majority of the silicon-bonded hydroxyl content present in the combination of resin copolymer (A) and polydiorganosiloxane (B). A number of methods for determining silicon-bonded hydroxyl content exist, but results with polymers of the resin copolymer (A) type tend to be variable. Therefore it is better to include a sufficient excess of endblocking agent to provide at least a 10% excess (0.88:1 mole ratio for 0.8:1 mole ratio compositions) of endblocking triorganosilyl units to the silicon-bonded hydroxyl radicals. When the purpose is only to remove a substantial amount of the residual silicon-bonded hydroxyl content e.g., using a heating step to effect condensation of resin copolymer (A) with polydiorganosiloxane (B) in addition to endblocking, the minimum plus the aforementioned excess of endblocking agent is preferred.

When one desires to alter the properties of the pressure-sensitive adhesive by including endblocking agents with specific radicals, it is desirable to use a resin copolymer (A) that has a higher silicon-bonded hydroxyl content (e.g., 1–4 weight percent) so that more of the triorganosilyl units containing such radicals will be reacted into the condensation product of resin copolymer (A) and polydiorganosiloxane (B). Since condensation can also occur in the process of the present invention, inclusion of greater than the stoichiometric amount of endblocking triorganosilyl units relative to the silicon-bonded hydroxyl radicals and X radicals can affect the molecular weight of the condensation product which is the silicone pressure-sensitive adhesive. Use of more than a 1:3 mole ratio of total silicon-bonded hydroxyl radicals and X radicals present in resin copolymer (A) polydiorganosiloxane (B) to total endblocking triorganosilyl units provided by the endblocking agents added is believed to be excessive and wasteful.

Examples of endblocking agents are $(Me_3Si)_2NH$, $(ViMe_2Si)_2NH$, $(MePhViSi)_2NH$, $(CF_3CH_2CH_2Me_2Si)_2NH$, $(ClCH_2Me_2Si)_2NH$, $Ph_3SiNH_2$, $(n-C_3H_7)_3SiNH_2$, $Me_3SiNH_2$, $MePhViSiNH_2$, $Me_2ViSiNH_2$, $CH_3C(O)OCH_2CH_2CH_2Me_2SiNH_2$, $CH_3COOCH_2Me_2SiNH_2$, $NCCH_2CH_2Me_2SiNH_2$, $HO(CH_2)_4Me_2SiNH_2$, $HOCH_2CH_2OCH_2Me_2SiNH_2$, $H_2N(CH_2)_3Me_2SiNH_2$, $H_2NCH_2CH_2NHCH_2CH_2CH_2SiNH_2$, $H_2N(CH_2)_3SiNH_2$, $CH_3CH_2CH_2S(CH_2)_3SiNH_2$ and $CH_3CH_2CH_2O(CH_2)_3SiNH_2$.

Preferably, the endblocking agents employed are of the type $(AR_2Si)_2NH$ such as $(Me_3Si)_2NH$ or $(ViMe_2Si)_2NH$.

The above endblocking agents generate the silanol condensation catalyst ammonia when the triorganosilyl unit reacts with silicon-bonded hydroxyl radicals and/or X radicals present in the resin copolymer (A) and polydiorganosiloxanes (B). As will be further described, the condensation step (II) of the present invention is done with heating and the presence of the catalyst causes the condensation of the resin copolymer (A) and polydiorganosiloxanes (B) to take place at the same time that endblocking by the endblocking triorganosilyl units occurs. While the ammonia generated is volatile and much of it is eliminated during heating, it was noted that the silicone pressure-sensitive adhesive compositions made via the Blizzard and Swihart process using organosilazane endblocking agents had an ammonia odor and exhibited relatively low hold times. Although we do not want to limit the invention to a particular theory, this low hold time was thought to be due to the presence of residual ammonia in the composition. This therory was supported by the fact that incorporation of water at some point during processing tended to result in a composition exhibiting higher hold times than did similar compositions made without addition of water.

Thus, the method of the present invention includes the incorporation of 0.1 to 10 moles of water per mole of $=NH$ provided by all endblocking agent (C) present in the composition. The amount of water added does not appear to be critical; 0.1 moles of water appears to be an effective minimum while more than about 10 moles of water per mole of $=NH$ appears to be wasteful.

The distinguishing feature of this invention over the Blizzard and Swihart invention is the combination of the use of water and the hereinafter-defined ammonia scavenger compound when ammonia releasing endblocking agents such as organosilazanes are used in the Blizzard and Swihart process to manufacture silicone pressure-sensitive adhesives.

Thus, the present invention further includes the use of from 0.001 to 10 parts by weight per 100 parts by weight of resin copolymer (A) and polydiorganosiloxane (B) of at least one "ammonia scavenger compound". An "ammonia scavenger compound" is an organofunctional compound such as an alcohol which has one or more polar sites such as a hydroxyl radical and one or more non-polar sites. While not wishing to be limited to a particular theory of operation, the polar portion of the ammonia scavenger compound functions to associate with the ammonia generated by the endblocking agent more strongly than with the silicone portion of the composition to enable it to be removed from the composition when it is no longer needed. The ammonia scavenger compound must have a sufficiently non-polar character to enable that portion of the compound to associate with the non-polar portions of the silicone pressure-sensitive adhesive composition to enable it to make its polar site available for association with the ammonia being released from the endblocking agent. Thus highly polar organic compounds such as methanol will not serve the function of being an ammonia scavenger as well as isopropanol. The ammonia scavenger compound must also be sufficiently volatile to be capable of being stripped from the pressure-sensitive adhesive composition at the temperatures at which the composition is being processed (typically 80° C. to 160° C.). The ammonia scavenger compound appears to work synergistically with the added water to greatly increase lap shear stability, particularly the resistance to creep measured in accordance with the stringent procedure set out in U.S. MIL-T-81287, of silicone pressure-sensitive adhesives of the Blizzard and Swihart type. Very small amounts of ammonia scavenger compounds such as about 0.001 parts per 100 parts of total resin copolymer (A) and polydiorganosiloxane (B) appear to greatly increase the lap shear stability while the use of more than about 10 parts of the compound is believed to be wasteful.

Examples of ammonia scavenger compounds are those such as alcohols of the formula $HOC_mH_{2m+1}$ where m has a value of from 2 to 4 such as ethanol, iso-propanol, n-butanol and isobutanol; glycol ethers of the formula $HOC_xH_{2x}(OC_xH_{2x})_y(O)_vH$ where x has a value of from 2 to 6, y has a value of from 0 to 3 and v has a value of 0 or 1 such as ethylene glycol, propylene glycol, hexylene glycol, $HOCH_2CH_2OCH_2CH_3$, $HO(CH_2)_6O(CH_2)_6OH$, and $HO(CHCH_3CH_2O)_3H$; ethers of the formula having the formula $C_wH_{2w+1}(OC_xH_{2x})_yOC_wH_{2w+1}$ where w has a value of from 1 to 3 and x and y are as above such as $C_2H_5OC_2H_5$, $C_2H_5OCH_2CH_2OC_2H_5$, $C_2H_5O(CHCH_3CH_2)OC_2H_5$, $C_4H_9O(CHCH_3CH_2)OC_4H_9$, $C_2H_5O(CH_2CH_2O)_3C_2H_5$, and $C_2H_5O(CH_2CH_2O)_2C_2H_5$; esters of the formula $C_wH_{2w+1}C(O)OC_nH_{2n+1}$ and $HC(O)OC_nH_{2n+1}$ where w and n are as defined above such as methyl acetate, ethyl acetate, propyl acetate, amyl acetate, hexylacetate, ethyl formate and ethyl propionate. Most preferred as an ammonia scavenger compound are alcohols. Primary alcohols may be more effective than secondary alcohols followed by tertiary alcohols. Isopropanol, a secondary alcohol, was found to be effective. Just as water alone improves lap shear stability, the ammonia scavenger compounds alone are expected to improve lap shear stability.

When necessary, an effective amount of an organic solvent can be added separately to the mixture of resin copolymer (A), polydiorganosiloxane (B), and endblocking agent (C) to reduce the viscosity thereof or else can be present as a result of the fact that (A) and/or (B) was added as a solvent solution. The solvent should be inert with respect to (A), (B), and (C) and not react with them during the condensation step. As noted earlier, resin copolymer (A) is often made as a solvent solution in toluene or xylene. Use of an organic solvent is often necessary when polydiorganosiloxane (B) is in the form of a high viscosity gum which results in a high viscosity mixture even when the mixture is heated to typical processing temperatures of 100°–150° C. Use of an organic solvent which permits azeotropic removal of water is preferred. The term "organic solvent" includes a single solvent such as benzene, toluene, xylene, trichloroethylene, perchloroethylene, ketones, halogenated hydrocarbons such as dichlorodifluoromethane, naphtha mineral spirits and mixtures of two or more organic solvents to form a blended organic solvent. Use of a ketone such as methylisobutyl ketone as at least a portion of the solvent is preferred when fluorinated radicals are present on a major amount of the siloxane units present in polydiorganosiloxane (B) for compatibility reasons. Preferably, the mixture contains a hydrocarbon solvent selected from the group consisting of benzene, toluene and xylene.

In accordance with the preferred method of the present invention, in Step (I) the resin copolymer (A) and polydiorganosiloxane (B), are mixed together with water (D), ammonia scavenger compound (E) and any organic solvent (F) that is to be added. To accomplish effective removal of the ammonia generated by endblocking agent (C), the preferred method involves conducting the condensation reaction of (A), (B) and (C) with heating at 80° C. to 160° C. and, more preferably, under solvent reflux conditions. Thus, after (A), (B), (D), (E), and (F) are mixed together, endblocking agent (C) is added to the mixture. The mixture is stirred at room temperature to insure that all ingredients are mixed well. To simplify the procedure, (D) and (E) are preferably added at the beginning of the procedure although, less preferably, these ingredients could be added at any point during the hereinafter-described condensation step (II) since the function of these ingredients is to remove the ammonia from the pressure-sensitive adhesive composition being made. For example, (D) and (E) may also be added just prior to the hereinafter-described stripping step (III). This may require cooling of the mixture before the lower boiling water and in some cases, compound (E), can be added which is less desirable than including (D) and (E) initially.

The condensation step (II) is begun when addition of endblocking agent (C) such a silazane or a catalyst is made at room temperature. Condensation continues when the mixture is heated from 80° C. to 160° C., preferaby to the reflux temperature of the mixture. Condensation is preferably allowed to proceed at least until the rate of evolution of condensation by-products such as water is substantially constant. Heating is then continued until the desired physical properties such as viscosity, tack and adhesion values are obtained. Typically the mixture is allowed to reflux for an additional 1 to 4 hours after the beginning of the evolution of condensation by-products. At that point, the rate of evolution of such by-products has usually become substantially constant. Longer reflux times may be needed for compositions containing organofunctional radicals such as fluorinated radicals on the polydiorganosiloxane (B) or endblocking agent which are less compatible with those on the resin copolymer (A). During the condensation step, condensation by-products are at least periodically removed from the mixture such as by azeotropic removal of by-products or by removing some solvent periodically from the mixture.

When the condensation reaction is substantially complete, Step (III) is begun wherein the residual endblocking agent, water (D), ammonia scavenger compound (E), and any remaining ammonia is solvent stripped away by removing excess solvent during or after the step (II) involving azeotropic removal of condensation by-products. Removal of solvent will carry away more volatile ingredients as part of the solvent or as separate ingredients which are carried with the solvent during stripping. The nonvolatile solids content of the resulting silicone pressure-sensitive adhesive composition can be adjusted by adding or removing solvent, the solvent present can be completely removed and a different organic solvent added to the silicone pressure-sensitive adhesive product, the solvent can be removed completely if the condensation product is sufficiently low in viscosity or else the mixture can be recovered and used as is. Presently, it is preferred to have the pressure-sensitive adhesive compositions in organic solvent solution wherein the organic solvent comprises from 30 to 70 weight percent of the total mixture of (A), (B), (C) and (F), particularly when the polydiorganosiloxane of (B) has a viscosity at 25° C. of greater than 100,000 centipoise.

The above procedure is preferred for compositions wherein the polydiorganosiloxanes (B) are greater than about 100,000 centipoise in viscosity at 25° C. When the viscosity of the polydiorganosiloxanes (B) are less than about 100,000 centipoise at 25° C., the physical properties of pressure-sensitive adhesives obtained therefrom are not always as high in tack and adhesion as may be desired and may also tend to result in adhesives possessing some adhesive transfer between substrates, see for example, the Pail Patent cited above.

For this reason, it is preferred that a precondensation step such as that employed in the Pail Patent be used in the process of the present invention prior to the condensation step in the presence of an endblocking agent (C) be used when a substantial amount of the polydiorganosiloxanes (B) have a viscosity of less than 100,000 centipoise at 25° C. In this case, Step (I) of the method of the present invention comprises the steps of (Ia) mixing resin copolymers (A), polydiorganosiloxanes (B)

and any organic solvent (F) together in the presence of a silanol condensation catalyst such as ammonium carbonate, (Ib) condensing (A) and (B) to form a condensed product such as by heating under reflux conditions for 1 to 10 hours and (Ic) mixing the product of step (Ib) with (C), (D) and any further amount of organic solvent (F) which is necessary prior to proceeding with step (II) of the method of the present invention. The product of step (Ib) is thus increased in molecular weight by the precondensation step, but still contains residual silicon-bonded hydroxyl groups which are endblocked in accordance with the present method of the invention to result in an improved pressure sensitive adhesive composition. The resulting silicone pressure-sensitive adhesive composition is then processed according to Steps (II) and (III) and the solvent can be adjusted as described above to obtain a finished silicone pressure-sensitive adhesive composition.

The silicone pressure-sensitive adhesive compositions of the present invention can be used to prepare pressure-sensitive adhesive films as is in accordance with well-known techniques or else can, optionally, be further cured to increase the cross-link density of the adhesive film to improve the physical properties of the film, particularly the ability of the adhesive to maintain a bond at high temperature such as 350° F. This is desirable where the adhesive is to be used in industrial applications where high tack (e.g., $>400g/cm^2$), adhesion (e.g., 1000g/inch) and hold values are needed. Uncured adhesives generally do not have cohesive strengths which are as high as those exhibited by cured adhesives. To obtain good lap shear stability, the composition must be cured. In accordance with well-known procedures, about 0.5-3% by weight of a peroxide catalyst such as benzoyl peroxide or 2,4-dichlorobenzoyl peroxide based on adhesive solids can be added to the composition and the film can be cured at 110° C. to 200° C. for 1 to 10 minutes. The lap shear stability can be increased to a certain extent by lengthening the cure time and/or increasing the level of catalyst employed. As is known in the art, excessive amounts of peroxide can have deleterious effects on adhesive properties. Other free radical cross-linking methods such as electron beam or actinic radiation may be useful in curing adhesive films, particularly when the silicone pressure-sensitive adhesive contains aliphatically unsaturated radicals such as vinyl radicals, when the resin copolymer (A) and/or the endblocking triorganosilyl units of (C) of the silicone pressure-sensitive adhesive contain aliphatically unsaturated radicals such as vinyl radicals, the adhesive can be cured at room temperature or by heating by using an $\equiv$SiH bearing coreactant in conjunction with a chloroplatinic acid catalyst in the well-known manner.

Another particularly useful application for the silicone pressure-sensitive compositions of the present invention is the subject of a U.S. patent application Ser. No. 665,803 to Virgil L. Metevia and John T. Woodard entitled "Transdermal Drug Delivery Devices with Amine-Resistant Silicone Adhesives" which is filed concurrently herewith and is assigned to the same assignee as is the present invention. That Metevia, et al. Application describes a transdermal drug delivery device for the controlled delivery of amino-functional drugs such as phenylpropanolamine. Silicone pressure-sensitive adhesives are very desirable for body contact use because they are permeable, moisture-resistant and are essentially hypoallergenic and non-irritating to the skin. Current silicone adhesives for such skin contact uses must possess low tack and adhesion value and contain silanol groups which are capable of being condensed by amines. As a result of contact with such drugs, the adhesive tends to dry out on storage and the adhesive will no longer adhere to the skin. Silicone pressure-sensitive adhesives made in accordance with the present invention are relatively insensitive to the effects of amines because a substantial proportion of the silicon-bonded hydroxyl radicals are endblocked and are very valuable as adhesives for such devices because of their stability towards the deleterious effects of amines on tack and adhesion values.

Other well-known ingredients such as fillers or pigments may be added to the silicone pressure-sensitive adhesives of the present invention provided that such materials do not adversely affect the adhesive properties of the compositions. It is also anticipated that cold blends of two or more silicone pressure-sensitive adhesive compositions may be made to obtain compositions having intermediate properties. For example, up to about 30 weight percent of a silicone pressure-sensitive adhesive composition having 70-90 parts of resin copolymer (A) and 10-30 parts of polydiorganosiloxane (A) having a high adhesion value (e.g., >1300g/inch) can be blended with 70-90 weight percent of a silicone pressure-sensitive adhesive composition of the present invention having 53 parts of resin copolymer (A) and 47 parts of polydiorganosiloxane (B) to improve the adhesion value of the silicone pressure-sensitive adhesive composition (all parts and percentages are by weight based on nonvolatile solids content). Although it is preferred that the additives be made in accordance with the present invention, in some applications it may be possible to employ less than about 30 weight percent of silicone pressure-sensitive adhesive containing some free silicon-bonded hydroxyl content, the less the better, without decreasing the stability of the silicone pressure-sensitive adhesives of the present invention to a large extent. The modifier need not be a pressure-sensitive adhesive and can comprise from 1 to 100 parts by weight of a copolymer (A) and 0 to 99 parts by weight of a polydiorganosiloxane (B).

Silicone pressure-sensitive adhesive compositions of the present invention can find use in applications where such adhesives have been used in the past such as in the manufacture of pressure-sensitive adhesive tapes, as pressure-sensitive adhesives for seaming fabrics and the like. When sufficiently compatible, they may be added to organic pressure-sensitive adhesives to change the properties of such adhesives. The stability of the adhesives of the present invention make them particularly desirable for use on tapes because the tack and adhesion properties remain reasonably constant with aging.

The following Examples are illustrative only and should not be construed as limiting the invention which is properly delineated in the appended claims. In the following Examples, all parts and percentages are by weight unless otherwise specified.

Quantitative tack measurements reported therein are performed through use of a POLYKEN brand Probe Tack Tester (Testing Machines, Inc., Amityville, NY). Briefly summarized, tack measurements, expressed in units of grams/cm$^2$ of tack, were obtained using a probe velocity of 0.5 cm/sec., a contact pressure of 100 grams/cm$^2$, and contact time of 0.5 seconds. Quantitative adhesion measurements reported therein were obtained through use of a one inch wide aluminum or MYLAR ® tape which contained a 1.0 mil (or as reported in the Examples) layer of cured adhesive. The tape was adhered to a stainless steel panel and stripped at a rate of 12 inches/minute at an angle of 180°, with the results expressed in ounces (or grams) per inch. The adhesion test corresponds to ASTM D-1000.

Creep (high temperature lap shear stability) was determined according to Mil-T-81287, hereby incorporated by reference, wherein the pressure-sensitive adhesive is applied at a thickness of 1.5 mils (0.038 mm) to the full width of one inch wide strip of a 2 mil (0.05 mm) dead soft aluminum foil for a distance of greater than 1 inch (2.54 cm) from the end and the pressure-sensitive adhesive is cured. The strip having the cured pressure-sensitive adhesive film is adhered to a strip of stainless steel in such a manner that there is a one square inch (6.45 cm$^2$) contact of adhesive with the stainless steel strip and are adhered with a force of a rolled 10 lb (4.5 kg.) weight. The adhered strips are then fixed in a vertical orientation with the upper strip being secured and the lower strip bearing a 100 gram (g.) weight. The test is considered to be passed if less than a maximum slippage of ½ inch (1.27 cm) has occurred after heating the adhered strips over a 1 hour period to 500° F. and thereafter holding for 1 hour at 500° F.

Hold time was determined as follows. The pressure-sensitive adhesive was applied at a thickness of 1.5 mil (0.038 mm) to a ½ inch (12.7 mm) wide strip of MYLAR ® (a trademark of E.I. DuPont de Nemours It. Co., Wilmington, Del.) polyester film having a thickness of 1 mil (0.025 mm). After curing the pressure-sensitive adhesive, the strip was overlapped 1 inch (2.54 cm) on one end of a 1 inch (2.54 cm) wide stainless steel strip, pressed together with a 4.5 pound (2.0 kg) rolled weight and suspended vertically with the upper strip secured by its non-overlapped end and the lower strip bearing a 500g. weight at its now-overlapped end. Hold time is the time elapsed before the strips part while being held in such a configuration in an oven at 350° F.

The nonvolatile solids content ("N.V.C.") of a material was determined by placing 1.5g of the material in an aluminum foil dish, 60 mm in diameter and 15 mm deep, and heating the sample for 1 hour at 150° C. in an air-circulating oven. The heated sample was then cooled to room temperature and reweighed to determine the weight of the nonvolatile material (w). The N.V.C., in percent, is equal to 100* w/1.50. The N.V.C. of Resin A$_1$ was determined by mixing 1.5g. of the resin with 0.75g. of a 100 centistoke viscosity trimethylsiloxy-endblocked polydimethylsiloxane fluid in a weighing dish and heating for 2 hours at 150° C. as described above to obtain the N.V.C.

The silicon-bonded hydroxyl content was determined using a lithium aluminum hydride di-N-butyl amide titration based upon the one described by Kellum, et.al., and Chem. 39,1623 ff (1967), see also Jorden, and Chem. 30,297 (1964). The acid number was determined by titrating 1.00g. of the material to a bromcresol purple endpoint using alcoholic KOH and is equal to the number of mg of KOH so used.

The viscosity of a material was determined at 25° C. with a Brookfield ® Viscometer Model LVF using the spindle and speed reported in the Examples. Unless otherwise specified, all parts and percentages reported are in parts by weight. The following ingredients were used in the Examples:

Resin A-1: A xylene solution of a resinous copolymeric siloxane prepared from 45 parts of sodium silicate (41.6° Be) and 20 parts of Me$_3$SiCl according to the method of the Daudt, et al. patent noted above containing Me$_3$SiO$_\frac{1}{2}$ units and SiO$_{4/2}$ units in a ratio of approximately 0.75:1.0, and N.V.C. typically about 69–71%, an acid number in the range of 0.3 to 1.4, and a viscosity in the range of 10–14 centipoise at 25° C. at 60% N.V.C. in xylene solution, and a silicon-bonded hydroxyl content of about 2.5 weight percent based on a 100% N.V.C. Several different batches of this copolymer were used in the following examples.

Polydiorganosiloxane B-1 ("PDOS B-1"): A siloxane gum endblocked with silicon-bonded hydroxyl radicals having a viscosity of about 25,000,000 centipoise at 25° C. and a Williams Plasticity Value in the range of 54–60 mils (4.2g. sample) at 90% N.V.C., silicon-bonded hydroxyl content of less than about 0.01% based on a 100% nonvolatile solids content. PDOS B-1 was prepared by reaction of 100 parts of a polydimethylsiloxane cyclic trimer with 0.40 parts of a hydroxy-endblocked polydimethylsiloxane fluid having a viscosity of 60-70 centistokes at 25° C. and 0.24 parts of a potassium silanolate catalyst.

EXAMPLE 1

This Example demonstrates the method of the present invention to produce a silicone pressure-sensitive adhesive.

Example 1 was prepared by charging 146.0g Resin A-1 (~70% N.V.C.), 100.5 g PDOS-B1 (~90% N.V.C.), 235g xylene, 5.5g deionized water and 2.5g isopropanol ("~" is approximately) to a 3-necked flask equipped with a stirring rod, thermometer, Dean-Stark trap with a water-cooled condenser and a heating mantle. The ingredients were stirred and 10.5g hexamethyldisilazane was added to the stirring mixture which had a temperature of 28° C. After 15 minutes, the temperature of the contents of the flask was 30° C. and the contents of the flask was then heated to reflux temperature. The mixture was maintained at reflux temperature and condensation by-products were removed from the Dean-Stark trap from time to time. The condensation of the contents of the flask was deemed to be substantially complete 3½ hours (temperature was 131° C.) after the start of heating (about 3 hours of reflux time) and stripping of solvent through the Dean-Stark trap was begun. After 1.5 hours, the temperature of the contents of the flask had reached 138° C. and 162 g solvent had been stripped from the contents of the flask. The heat was turned off and the silicone pressure-sensitive adhesive composition was cooled to room temperature. The resulting composition had a viscosity of 48,490 centistokes (centipoise and centistokes are about equal since the specific gravity of these materials is about 1.0) at 25° C. A 1.4 mil (0.036 mm) film of the above composition which had been catalyzed with 2% benzoyl peroxide (based on the N.V.C. of the composition) and cured 5 minutes at 150° C. was found to have a tack value of 710 g/cm$^2$, an adhesion value of 850 g/inch and passed the creep test.

This composition contained 4.7 moles of water per mole of =NH provided by the hexamethyldisilazane, 2.8 parts of isopropanol per 100 parts of Resin A-1 (53 parts) and PDOS B-1 (47 parts) present and the endblocking agent provided about 87% of the stoichiometric amount of triorganosilyl units needed to react with the silicon-bonded hydroxyl radicals present in Resin A-1 (about 2.5% silicon-bonded hydroxyl content) and PDOS B-1 (silicon-bonded hydroxyl content assumed to be very small relative to that of Resin A-1).

EXAMPLES 2-18

In these Examples, various ratios of water and ammonia scavenger compound (isopropanol) were used to prepare compositions in accordance with the present invention. The resin A-1 to PDOS B-1 ratios were also varied. The endblocking agent used was hexamethyldisilazane. The compositions were prepared as in Example 1 using the ingredients and amounts listed in Table I. Table I also lists the ratio of Resin A-1 to PDOS B-1 ("A-1/B-1"), the ratio ratio of trimethylsilyl endblocking units ("TEU") to silicon-bonded hydroxyl radicals ("OH") as a percentage (TEU/OH × 100), and the viscosity of the resulting composition.

Table I also lists the processing time for each composition. Generally, the composition of each Example was prepared as in Example 1 where the hexamethyldisilazane ("HMDS") was added after all of the other ingredients were charged to the flask, and the ingredients were stirred for at least 15 minutes at about room temperature before heating to the reflux temperature of the contents was begun. Typically reflux began and condensation by-product collection began within about 30 minutes from the start of heating. The contents were kept at reflux temperature for about 3 hours and then between about 150 to 162g of solvent was stripped from the contents over a period of 15 to 30 minutes. Each composition was then cooled to room temperature and the viscosity was measured.

The physical properties of the cured pressure-sensitive adhesives made in these Examples were catalyzed and cured as in Example 1. The results are reported in Table II along with the moles (and parts per 100 parts of Resin A-1 and PDOS B-1) of isopropanol ("IPA"), water ("$H_2O$"), and ammonia ("$NH_3$"), wherein the latter is calculated on the basis of the amount of hexamethyldisilazane added initially. Also shown in Table II are the calculated molar ratios of isopropanol to water ("IPA/$H_2$"), isopropanol to ammonia generated ("IPA/$NH_3$") and water to ammonia generated ("$H_2O/NH_3$").

Except for Examples 5 and 17 which gave both poor hold and failed the test for resistance to creep (high temperature lap shear stability), all of the Examples either exhibited a hold time of greater than 170 hours or else passed the more stringent resistance to creep test. The hold time for Examples 6 and 11 was discontinued at 30 hours since they had passed the resistance to creep test and were expected to have a relatively long hold time. Examples 13 and 16 passed the resistance to creep test and exhibited a hold time of greater than 170 hours while Example 4 which also passed the resistance to creep test had a hold time in excess of 240 hours.

As can be seen from an examination of Tables I and II, the amounts and ratios of isopropanol and water to ammonia generated and to themselves could be varied over relatively wide ranges while still exhibiting an improvement in lap shear stability over that reported in the aforementioned Blizzard and Swihart Patent Application.

Example 12 contained a relatively high amount of Resin A-1 and therefore had a significantly higher silicon-bonded hydroxyl content than a composition made with 45 parts of Resin A-1 and 55 parts of PDOS B-1. Example 12 contained a relatively small amount of isopropanol and a low amount of water, yet exhibited a hold time of 192+hours.

Examples 5 and 17 exhibited poor lap shear stability, but the ratios of alcohol, water and ammonia fell within ranges wherein other compositions exhibited an improvement in lap shear stability. The viscosity of Examples 5 and 17 was much lower than that exhibited by the other Examples and it is possible that some unknown processing factor caused the reduction in viscosity and consequent poor lap shear stability for these compositions.

TABLE I

| Ex. # | Resin A-1 (g) | PDOS-1 (g) | Xylene (g) | HMDS (g) | $H_2O_2$ (m) | IPA[1] (n) | A-1/B-1[2] | TEU/OH[3] (%) | Reflux[4] time | Visc.[5] (cp) |
|---|---|---|---|---|---|---|---|---|---|---|
| 2 | 144.8 | 100.0 | 233.6 | 10/6 | 11.20 | 0.02(0.01) | 53/47 | 88 | 2'50" | 47000 |
| 3 | 144.8 | 100.0 | 233.6 | 18.2 | 3.60 | 0.02(0.01) | 53/47 | 151 | 3'10" | 48000 |
| 4 | 125.0 | 118.5 | 242.3 | 10.7 | 3.60 | 0.02(0.01) | 45/55 | 103 | 3'20" | 49500 |
| 5 | 142.3 | 98.0 | 229.5 | 17.8 | 11.00 | 1.15(0.61) | 53/47 | 151 | 3' | 4000 |
| 6 | 122.7 | 116.4 | 238.0 | 10.5 | 11.10 | 1.20(0.63) | 45/55 | 103 | 3'15" | 40500 |
| 7 | 148.0 | 102.0 | 238.8 | 10.7 | 0.16 | 0.02(0.01) | 53/47 | 87 | 2'50" | 51500 |
| 8 | 146.7 | 101.2 | 236.2 | 10.6 | 3.60 | 1.18(0.61) | 53/47 | 87 | 3'15" | 59000 |
| 9 | 146.7 | 101.2 | 236.7 | 10.7 | 3.60 | 1.20(0.62) | 53/47 | 87 | 3' | 46000 |
| 10 | 146.7 | 101.2 | 236.7 | 10.6 | 3.60 | 1.20(0.62) | 53/47 | 87 | 2'50" | 44500 |
| 11 | 122.7 | 116.4 | 238.0 | 18.1 | 3.50 | 1.20(0.63) | 45/55 | 178 | 3'20" | 35000 |
| 12 | 166.2 | 82.6 | 228.3 | 18.1 | 3.50 | 1.30(0.62) | 61/39 | 131 | 3'20" | 20000 |
| 13 | 142.0 | 98.6 | 231.0 | 10.4 | 11.00 | 6.20(3.30) | 53/47 | 88 | 3'15" | 41000 |
| 14 | 147.5 | 101.7 | 238.0 | 18.3 | 3.40 | 6.10(3.13) | 53/47 | 149 | 3' | 40500 |
| 15 | 123.6 | 117.2 | 239.8 | 10.5 | 3.50 | 6.30(3.28) | 45/55 | 102 | 2'55" | 60000 |
| 16 | 125.6 | 119.0 | 243.4 | 10.7 | 0.16 | 1.20(0.62) | 45/55 | 103 | 3'10" | 55000 |
| 17 | 146.2 | 100.8 | 235.8 | 10.6 | 0.16 | 6.30(3.26) | 53/47 | 87 | 2'55" | 4650 |
| 18 | 145.5 | 100.3 | 234.8 | 18.3 | 0.16 | 1.17(0.61) | 53/47 | 151 | 3'15" | 40500 |

[1]IPA = isopropanol.
[2]Ratio of parts of Resin A-1/parts PDOS B-1.
[3](Total moles of trimethylsiloxy units × 100) ÷ total moles SiOH in Resin A-1.
[4]Total time process conducted under reflux conditions before solvent stripping was started, in hours (') and minutes (").
[5]Viscosity in centipoise at 25° C.

TABLE II

| Ex. | HOLD (hrs) | CREEP[1] | TACK (g/cm$^2$) | ADH. (g/in) | FILM[2] (mil) | IPA[3] (m) | $H_2O$[3] (m) | $NH_3$[3] (m) | IPA/$H_2O$[4] (m/m) | IPA/$NH_3$[4] (m/m) | $H_2O/NH_3$[4] (m/m) |
|---|---|---|---|---|---|---|---|---|---|---|---|
| 2 | 306+ | F | 630 | 1060 | 2.0 | 0.0003 | 0.622 | 0.0657 | 0.0005 | 0.0046 | 9.470 |
| 3 | 170+ | F | 550 | 980 | 1.5 | 0.0003 | 0.200 | 0.1128 | 0.0015 | 0.0027 | 1.770 |
| 4 | 240+ | P | 420 | 670 | 1.5 | 0.0003 | 0.200 | 0.0663 | 0.0015 | 0.0045 | 3.017 |
| 5 | 0.25 | F | 730 | 1120 | 1.5 | 0.0191 | 0.611 | 0.1103 | 0.0313 | 0.1730 | 5.539 |

TABLE II-continued

| Ex. | HOLD (hrs) | CREEP[1] | TACK (g/cm²) | ADH. (g/in) | FILM[2] (mil) | IPA[3] (m) | $H_2O$[3] (m) | $NH_3$[3] (m) | $IPA/H_2O$[4] (m/m) | $IPA/NH_3$[4] (m/m) | $H_2O/NH_3$[4] (m/m) |
|---|---|---|---|---|---|---|---|---|---|---|---|
| 6 | 30+ | P | 480 | 590 | 1.6 | 0.0200 | 0.617 | 0.0651 | 0.0324 | 0.3070 | 9.480 |
| 7 | 306+ | F | 570 | 1070 | 1.5 | 0.0003 | 0.009 | 0.0663 | 0.0333 | 0.0045 | 0.136 |
| 8 | 170+ | F | 640 | 950 | 1.5 | 0.0196 | 0.200 | 0.0657 | 0.0980 | 0.2980 | 3.044 |
| 9 | 170+ | F | 610 | 1000 | 1.5 | 0.0200 | 0.200 | 0.0663 | 0.1000 | 0.3016 | 3.017 |
| 10 | 306+ | F | 650 | 1150 | 2.2 | 0.0200 | 0.200 | 0.0657 | 0.1000 | 0.3040 | 3.044 |
| 11 | 30+ | P | 390 | 610 | 1.5* | 0.0200 | 0.194 | 0.1121 | 0.1031 | 0.1780 | 1.731 |
| 12 | 192+ | F | 280 | 1670 | 2.1 | 0.0216 | 0.194 | 0.1121 | 0.1113 | 0.1930 | 1.731 |
| 13 | 170+ | P | 680 | 1000 | 1.3 | 0.1032 | 0.611 | 0.0644 | 0.1689 | 1.6020 | 9.490 |
| 14 | 200+ | F | 600 | 1050 | 1.6 | 0.1020 | 0.189 | 0.1134 | 0.5397 | 0.8990 | 1.670 |
| 15 | 240+ | F | 440 | 720 | 1.7 | 0.1048 | 0.194 | 0.0651 | 0.5402 | 1.6100 | 2.980 |
| 16 | 170+ | P | 480 | 680 | 1.3* | 0.0200 | 0.009 | 0.0663 | 2.2220 | 0.3020 | 0.136 |
| 17 | <0.3 | F | 520 | 1100 | 1.5 | 0.1048 | 0.009 | 0.0657 | 11.6400 | 1.5950 | 0.137 |
| 18 | 170+ | F | 460 | 950 | 1.5 | 0.0195 | 0.009 | 0.1134 | 21.6700 | 0.1720 | 0.079 |

*Some blooming (which are peroxide by-products) of the film was noted.
[1]Pass or Fail MIL-T-81287.
[2]Adhesive film thickness in mils (0.001 inches).
[3]IPA = isopropanol added; $H_2O$ = water added; $NH_3$ = ammonia from endblocker, all in moles (m).
[4]molar ratios.

EXAMPLE 19

This Example demonstrates the use of an endblocking agent containing fluorinated alkyl radicals to prepare a silicone pressure-sensitive adhesive composition in accordance with the method of the present invention. In this Example, 550 parts of Resin A-1 (70% N.V.C.), 350 parts by weight of PDOS B-1 (90% N.V.C.), 675 parts of xylene, 84 parts of $(CF_3CH_2CH_2Me_2Si)_2NH$, 21 parts of water and 21 parts of isopropanol are processed in a manner similar to that of Example 1 over a period of 8 hours or longer until a single phase (compatible) mixture is obtained. A small amount of solvent is stripped during the last hour to obtain a composition having a N.V.C. of about 50%. This composition contains a ratio of 55 parts of Resin A-1 to 45 parts of PDOS B-1 on a 100% N.V.C. basis. Assuming that the silicon-bonded hydroxyl content of the Resin A-1 is 2.5% based on 100% N.V.C. and that of the PDOS B-1 is very small relative to that of the Resin A-1, the ratio of triorganosilyl endblocking units to silicon-bonded hydroxyl radicals is about 0.9:1. After the composition is catalyzed with 2% by weight of benzoyl peroxide based upon the N.V.C. of the composition and is cured for 5 minutes at 150° C., the cured film is expected to exhibit a hold time which is greater than that of the same composition processed without the addition of water and isopropanol.

That which is claimed is:

1. A method of making a silicone pressure-sensitive adhesive composition having improved lap shear stability which consists essentially of the steps of:
   (I) mixing
   (A) from 40 to 70 inclusive parts by weight of at least one benzene-soluble resin copolymer containing silicon-bonded hydroxyl radicals and consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present,
   (B) from 30 to 60 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C., and each T is R— or X—,
   (C) a sufficient amount of at least one organosilicon endblocking agent capable of generating an endblocking triorganosilyl unit of the formula $ZR_2Si$— to provide a 1:0.8 to 1:3 mole ratio of total silicon-bonded hydroxyl and X radicals present in said (A) and (B) to total endblocking triorganosilyl units provided by all endblocking agent present, said agent being selected from the group consisting of $ZR_2SiNH_2$ and $(ZR_2Si)_2NH$,
   (D) from 0.1 to 10 moles of water per mole of =NH provided by said (C),
   (E) from 0.001 to 10 parts by weight per 100 parts by weight of (A) and (B) of at least one ammonia scavenger compound selected from the group consisting of $HOC_mH_{2m+1}$, $HOC_xH_{2x}(OC_xH_{2x-})_y(O)_vH$, $C_wH_{2w+1}(OC_xH_{2x})_yOC_wH_{2w+1}$, $C_wH_{2w+1}C(O)$ $OC_nH_{2n+1}$ and $HC(O-)OC_nH_{2n+1}$, and
   (F) when necessary, an effective amount of an organic solvent which is inert with respect to (A) through (E), inclusive, to reduce the viscosity of a mixture of (A), (B), and (C),
   (II) condensing (A), (B) and (C) at a temperature of from 80° C. to 160° C. and at the same time at least periodically removing any condensation by-products from the mixture at least until a substantial amount of the endblocking triorganosilyl units have reacted with the silicon-bonded hydroxyl radicals and X radicals of said (A) and (B), and
   (III) stripping substantially any remaining condensation by-products, (D) and (E) from the mixture after the condensation reaction of step II is substantially complete,
   wherein each R is a monovalent organic radical selected from the group consisting of hydrocarbon radicals of from 1 to 6 inclusive carbon atoms, each X radical is selected from the group consisting of HO—, H— and R'O— radicals, each R' is an alkyl radical of from 1 to 4 inclusive carbon atoms, m has a value of from 2 to 4, n has a value of from 1 to 6, v is 0 or 1, w has a value of from 1 to 3, x has a value of from 2 to 6, y has a value of from 0 to 3, each A radical is selected from the group consisting of R— and halohydrocarbon radicals of from 1 to 6 inclusive carbon atoms, each Z radical is A— or QR"—, each R" is a divalent alkylene radical of from 1 to 6 inclusive carbon atoms, each Q is an organofunctional monovalent radical selected from the group consisting of RCOE'—, RE'OC—, NC—, R'E'—, HO—, $G_2N-$, $HO(R''O)_n-$ where $E'$ is $-O-$, $-NH-$ or $-S-$, and each $G$ is $R'-$ or $H-$, 2. The method as claimed in claim 1 wherein compound (E) is an alcohol of the formula $HOC_mH_{2m+1}$.

3. The method as claimed in claim 1 wherein said $R_3SiO_{\frac{1}{2}}$ units present in said copolymer of (A) are $(CH_3)_2R'''SiO_{\frac{1}{2}}$ units wherein each $R'''$ is selected from the group consisting of methyl, vinyl, and phenyl radicals, said ARSiO units of (B) are selected from the group consisting of $R'''_2SiO$ units, $(C_6H_5)_2SiO$ units and combinations of both, said $TRASiO_{\frac{1}{2}}$ endblocking units of (B) being of the unit formula $(HO)R'''CH_3SiO_{\frac{1}{2}}$, at least 50 mole percent of the $R'''$ radicals present in said (B) being methyl radicals and no more than 50 mole percent of the total moles of ARSiO units present in each polydiorganosiloxane of said (B) are $(C_6H_5)_2SiO$ units, each R present in said endblocking agent (C) is selected from the group consisting of methyl and phenyl radicals and Z is selected from the group consisting of methyl, vinyl and 3,3,3-trifluoropropyl radicals, wherein (A) is free of aliphatically unsaturated radicals when (B) contains such radicals and (B) is free of aliphatically unsaturated radicals when (A) contains such radical, the condensation step (II) is conducted at least until the rate of evolution of condensation reaction by-products is substantially constant, and compound (E) is isopropanol.

4. The method as claimed in claim 3 wherein the mixture prepared in Step I further contains a hydrocarbon solvent selected from the group consisting of benzene, toluene and xylene and the condensation reaction of Step II is conducted under solvent reflux conditions to effect removal of said condensation by-products.

5. The method as claimed in claim 4 wherein no more than 10 mole percent of the $R_3SiO_{\frac{1}{2}}$ units present in said (A) are $(CH_3)_2R''''SiO_{\frac{1}{2}}$ units, the remaining $R_3SiO_{\frac{1}{2}}$ units are $(CH_3)_3SiO_{\frac{1}{2}}$ units, said $R''''$ radicals being methyl or vinyl radicals, and no more than 10 mole percent of said ARSiO units of (B) being of the unit formula $CH_3R''''SiO$ and the remaining ARSiO units present in said (B) are $(CH_3)_2SiO$ units, each Z is a methyl or vinyl radical, the amount of said (A) being in the range of from 45 to 60 inclusive parts by weight, and the amount of said (B) being in the range of 40 to 55 inclusive parts by weight.

6. The method as claimed in claim 4 wherein the polydiorganosiloxane of (B) has a viscosity at 25° C. of greater than 100,000 centipoise, the solvent being present in an amount which is such that the solvent comprises from 30 to 70 weight percent of the total weight of the mixture of (A), (B), (C), and (F).

7. The method as claimed in claim 3 wherein the endblocking agent is $(AR_2Si)_2NH$.

8. The method as claimed in claim 5 wherein the endblocking agent is $(AR_2Si)_2NH$.

9. The method as claimed in claim 6 wherein the endblocking agent is $(AR_2Si)_2NH$ and each A is a methyl or vinyl radical.

10. The method as claimed in claim 1 wherein Step (I) comprises the Steps of (Ia) mixing (A), (B) and any (F) together, (Ib) condensing said (A) and (B) to form a condensed product and (Ic) mixing the product of Step (Ib) with (C), (D), (E) and any further amount of (F) which is necessary prior to proceeding with Step (II), said polydiorganosiloxane of (B) having a viscosity of from 100 to 100,000 centipoise at 25° C.

11. The method as claimed in claim 3 wherein Step (I) comprises the Steps of (Ia) mixing (A), (B) and any (F) together, (Ib) condensing said (A) and (B) to form a condensed product and (Ic) mixing the product of Step (Ib) with (C), (D), (E) and any further amount of (F) which is necessary prior to proceeding with Step (II), said polydiorganosiloxane of (B) having a viscosity of from 100 to 100,000 centipoise at 25° C.

12. The method as claimed in claim 5 wherein Step (I) comprises the Steps of (Ia) mixing (A), (B) and any (F) together, (Ib) condensing said (A) and (B) to form a condensed product and (Ic) mixing the product of Step (Ib) with (C), (D), (E) and any further amount of (F) which is necessary prior to proceeding with Step (II), said polydiorganosiloxane of (B) having a viscosity of from 100 to 100,000 centipoise at 25° C.

13. The method as claimed in claim 1 wherein Step (I) comprises the steps of (Ia) mixing (A), (B) and any (F) together, (Ib) adding said (C) to the mixture formed in step (Ia) to form a reaction mixture and (Ic) adding said (D) and (E) to the reaction mixture at a preselected point during said Step (II) prior to commencing Step (III).

14. The method as claimed in claim 3 wherein Step (I) comprises the steps of (Ia) mixing (A), (B) and any (F) together, (Ib) adding said (C) to the mixture formed in Step (Ia) to form a reaction mixture and (Ic) adding said (D) and (E) to the reaction mixture at a preselected point during said Step (IB) prior to commencing Step (III).

15. A pressure-sensitive adhesive composition comprising the product obtained from the method of claim 1.

16. A pressure-sensitive adhesive composition comprising the product obtained from the method of claim 2.

17. A pressure-sensitive adhesive composition comprising the product obtained from the method of claim 3.

18. A pressure-sensitive adhesive composition comprising the product obtained from the method of claim 4.

19. A pressure-sensitive adhesive composition comprising the product obtained from the method of claim 5.

20. A pressure-sensitive adhesive composition comprising the product obtained from the method of claim 6.

21. A pressure-sensitive adhesive composition comprising the product obtained from the method of claim 7.

22. A pressure-sensitive adhesive composition comprising the product obtained from the method of claim 8.

23. A pressure-sensitive adhesive composition comprising the product obtained from the method of claim 9.

24. A pressure-sensitive adhesive composition comprising the product obtained from the method of claim 10.

25. A pressure-sensitive adhesive composition comprising the product obtained from the method of claim 11.

26. A pressure-sensitive adhesive composition comprising the product obtained from the method of claim 12.

27. A pressure-sensitive adhesive composition comprising the product obtained from the method of claim 13.

28. A pressure-sensitive adhesive composition comprising the product obtained from the method of claim 14.

29. A pressure-sensitive adhesive composition comprising a blend of the product obtained from the method of claim 1 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

30. A pressure-sensitive adhesive composition comprising a blend of the product obtained from the method of claim 3 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

31. A pressure-sensitive adhesive composition comprising a blend of the product obtained from the method of claim 5 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

32. A pressure-sensitive adhesive composition comprising a blend of the product obtained from the method of claim 6 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

* * * * *